US012803011B2

(12) United States Patent
Choi et al.

(10) Patent No.: US 12,803,011 B2
(45) Date of Patent: Nov. 17, 2026

(54) SEPARATOR FOR FUEL CELL

(71) Applicants: Hyundai Motor Company, Seoul (KR); Kia Corporation, Seoul (KR)

(72) Inventors: Jae Hyeon Choi, Incheon (KR); Kyeong Min Kim, Namyangju-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 752 days.

(21) Appl. No.: 18/218,236

(22) Filed: Jul. 5, 2023

(65) Prior Publication Data

US 2024/0204214 A1 Jun. 20, 2024

(30) Foreign Application Priority Data

Dec. 19, 2022 (KR) ........................ 10-2022-0178372

(51) Int. Cl.
*H01M 8/0247* (2016.01)
*H01M 8/0258* (2016.01)

(52) U.S. Cl.
CPC ....... *H01M 8/0247* (2013.01); *H01M 8/0258* (2013.01)

(58) Field of Classification Search
CPC .. H01M 8/0258; H01M 8/026; H01M 8/0263; H01M 8/0265; H01M 8/0267; H01M 8/0269
See application file for complete search history.

(56) References Cited

U.S. PATENT DOCUMENTS 10,763,520 B2 9/2020 Jin et al.
10,811,701 B2 10/2020 Heo et al.
2006/0127744 A1 6/2006 Yamaga et al.
2008/0166621 A1 7/2008 Sano et al.
2011/0159396 A1 * 6/2011 Kleemann ........... H01M 8/0267 429/457

(Continued)

FOREIGN PATENT DOCUMENTS

JP 2004-039540 A 2/2004
JP 2009076294 A * 4/2009
JP 6184879 B2 8/2017

OTHER PUBLICATIONS

Machine Translation of JP2009076294A.*

*Primary Examiner* — Jonathan G Leong
(74) *Attorney, Agent, or Firm* — Morgan, Lewis & Bockius LLP

(57) ABSTRACT

A separator for a fuel cell includes a reaction region, manifold regions at opposite sides of the reaction region, each manifold region including manifolds configured to allow introduction or discharge of a reactive gas therethrough, and a diffusion region between the reactive region and each manifold region, to diffuse a flow of the reactive gas. A plurality of diffusion ribs is disposed in the diffusion region, to be spaced apart from one another. The plurality of diffusion ribs diffuses a flow of the reactive gas from the manifolds to the reaction region. At ends of the plurality of diffusion ribs adjacent to each manifold region, thicknesses of the plurality of diffusion ribs and gaps between adjacent ones of the plurality of diffusion ribs are different. At ends of the plurality of diffusion ribs adjacent to the reaction region, thicknesses of the plurality of diffusion ribs and gaps between adjacent ones of the plurality of diffusion ribs are equal.

13 Claims, 8 Drawing Sheets

(56) References Cited

U.S. PATENT DOCUMENTS

| | | | | |
|---|---|---|---|---|
| 2012/0115051 | A1 | 5/2012 | Yamamoto et al. | |
| 2015/0303492 | A1 * | 10/2015 | Jin | H01M 8/0232 429/514 |
| 2019/0393517 | A1 | 12/2019 | Jung et al. | |
| 2021/0184230 | A1 * | 6/2021 | Jeong | H01M 8/0258 |

* cited by examiner

-PRIOR ART- $IW_{1M} > IW_{2M} > IW_{3M}$ $IG_{1M} < IG_{2M} < IG_{3M}$ $IW_{1R} = IW_{2R} = IW_{3R}$ $IG_{1R} = IG_{2R} = IG_{3R}$ $OW_{1R} = OW_{2R} = OW_{3R}$ $OG_{1R} = OG_{2R} = OG_{3R}$ $OW_{1M} > OW_{2M} > OW_{3M}$ $OG_{1M} < IG_{2M} < IG_{3M}$

SEPARATOR FOR FUEL CELL

CROSS-REFERENCE TO RELATED APPLICATION

This application claims the benefit of Korean Patent Application No. 10-2022-0178372, filed Dec. 19, 2022, on in the Korean Intellectual Property Office, the disclosure of which is incorporated herein by reference.

TECHNICAL FIELD

The present disclosure relates to a separator for a fuel cell, and more particularly to a separator for a fuel cell capable of uniformly distributing a flow amount of reactive gas through an improvement in shape of diffusion ribs disposed in a diffusion region.

BACKGROUND

A fuel cell is a kind of electric generator to convert chemical energy of fuel into electrical energy through electrochemical reaction of the chemical energy in a stack. Such a fuel cell may be used not only for supply of driving power for industrial and domestic purposes and driving power of vehicles, but also for supply of electric power of miniature electronic products such as portable devices. Recently, the field of such fuel cell has been expanded in that the fuel cell is a highly efficient clean energy source.

In a general fuel cell, a membrane electrode assembly (MEA) is disposed at an innermost side of the fuel cell. The membrane electrode assembly is constituted by a polymer electrolyte membrane configured to migrate hydrogen protons, and catalyst layers coated on opposite surfaces of the polymer electrolyte membrane to enable reaction between hydrogen and oxygen, that is, an anode and a cathode, respectively.

In addition, a gas diffusion layer (GDL) is laminated on outsides of the membrane electrode assembly, that is, outsides of the membrane assembly where the anode and the cathode are disposed, respectively. A separator, which is disposed with a flow field, to supply a fuel and to discharge water generated through reaction, is disposed outside the gas diffusion layer. An end plate configured to support and fix the above-described constituent elements is coupled to outermost sides of the resultant structure. In this case, a gasket disposed to have various patterns is provided for sealing maintenance of hydrogen, oxygen (air), and a coolant flowing in the separator.

Meanwhile, generally, the separator is fabricated to have a structure in which a land having a support function and a channel (a flow field) defining a flow path of fluid are repeatedly disposed.

That is, since such a general separator has a curved structure repeatedly disposed with a land and a channel, the channel disposed at the side of one surface facing the gas diffusion layer is used as a space in which reactive gas such as hydrogen or air flows, and the channel opposite to the former channel is used as a space in which a cooling medium flows. Accordingly, one unit cell may be constituted by two separators, that is, one separator having a hydrogen/coolant channel and the other separator having an air/coolant channel.

FIG. 1 is a view showing a general separator for a fuel cell having a conventional configuration.

As shown in FIG. 1, the general separator, which is designated by reference numeral "10", is disposed, at a central portion thereof, with a reaction region 10*a* where reactive gases, that is, hydrogen and air (oxygen), react with each other, through lamination of a membrane electrode assembly and a gas diffusion layer. The general separator 10 is also disposed, at opposite sides of the reaction region 10*a*, with a pair of manifold regions 10*b* through which a plurality of manifolds 11 extend, respectively. A coolant or the reactive gases are introduced into or discharged out of the manifolds 11. A pair of diffusion regions 10*c* is disposed between the pair of manifold regions 10*b* and the reaction region 10*a*, respectively, to diffuse a flow of the reactive gases or the coolant.

In this case, the plurality of manifolds 11 disposed in the manifold region 10*b* is divided into manifolds 11*d* and 11*c*, through which a reactive gas, that is, hydrogen, is introduced or discharged, manifolds 11*a* and 11*f*, through which a reactive gas, that is, air, is introduced or discharged, and manifolds 11*b* and 11*e*, through which the coolant is introduced or discharged.

In addition, a plurality of diffusion ribs 13 is disposed in the pair of diffusion regions 10*c*. The plurality of diffusion ribs 13 diffuses the reactive gases and the coolant received from inlet-side manifolds, that is, the manifolds 11*a*, 11*d*, and 11*e*, and guides the diffused reactive gases and coolant to flow to the reaction region 10*a*. The plurality of diffusion ribs 13 also collects the reactive gases and the coolant discharged from the reaction region 10*a*, and guides the collected reactive gases and coolant to flow to outlet-side manifolds, that is, the manifolds 11*b*, 11*c*, and 11*f*.

For example, when the separator is a cathode separator, a reactive gas inlet 12*a*, through which air is introduced, is disposed near the inlet-side manifold 11*a*, and a reactive gas outlet 12*b*, through which air is discharged, is disposed near the outlet-side manifold 11*f*.

In addition, a plurality of inlet-side diffusion ribs 13*a* is disposed to be spaced apart from one another, in order to guide reactive gas, that is, air, in the inlet-side manifold 11*a* to flow to the reaction region while being diffused.

In addition, a plurality of outlet-side diffusion ribs 13*b* is disposed to be spaced apart from one another, in order to guide reactive gas, that is, air, to flow to the outlet-side manifold 11*f* while being collected.

In this case, the plurality of inlet-side diffusion ribs 13*a* is disposed such that the inlet-side diffusion ribs 13*a* have the same thickness at ends thereof adjacent to the inlet-side manifold 11*a*, and gaps between adjacent ones thereof at the ends adjacent to the inlet-side manifold 11*a* are uniform, and the plurality of inlet-side diffusion ribs 13*a* is also disposed such that the inlet-side diffusion ribs 13*a* have the same thickness at ends thereof adjacent to the reaction region, and gaps between adjacent ones thereof at the ends adjacent to the reaction region are uniform.

In addition, the plurality of outlet-side diffusion ribs 13*b* is disposed such that the outlet-side diffusion ribs 13*b* have the same thickness at ends thereof adjacent to the reaction region, and gaps between adjacent ones thereof at the ends adjacent to the reaction region are uniform, and the plurality of outlet-side diffusion ribs 13*b* is also disposed such that the outlet-side diffusion ribs 13*b* have the same thickness at ends thereof adjacent to the outlet-side manifold 11*f*, and gaps between adjacent ones thereof at the ends adjacent to the outlet-side manifold 11*f* are uniform.

In particular, the plurality of inlet-side diffusion ribs 13*a* and the plurality of outlet-side diffusion ribs 13*b* are disposed in point symmetry with reference to a center of the reaction region.

Since the plurality of inlet-side diffusion ribs 13*a* and the plurality of outlet-side diffusion ribs 13*b* are disposed under the same conditions in terms of thickness and gap, reactive gas, that is, air, must theoretically be introduced in a uniformly diffused state and must be discharged in a uniformly collected state. In a practical stack, however, there is a problem in that reactive gas, that is, air, flows excessively along those of the inlet-side diffusion ribs and the outlet-side diffusion ribs respectively disposed at upper and lower regions corresponding to portions of the diffusion regions having a short air flow path, when viewed in the direction of gravity.

The above matters disclosed in this section are merely for enhancement of understanding of the general background of the disclosure and should not be taken as an acknowledgement or any form of suggestion that the matters form the related art already known to a person skilled in the art.

SUMMARY

Therefore, the present disclosure has been made in view of the above problems, and it is an object of the present disclosure to provide a separator for a fuel cell capable of uniformly distributing a flow amount of reactive gas by adjusting thicknesses of diffusion ribs and gaps between adjacent ones of the diffusion ribs on a region basis.

In accordance with an aspect of the present disclosure, the above and other objects can be accomplished by the provision of a separator for a fuel cell including a reaction region disposed at a central portion of the separator, a pair of manifold regions disposed in a vicinity of the reaction region, each of the pair of manifold regions including a plurality of manifolds configured to allow a reactive gas to be introduced or discharged therethrough, and a pair of diffusion regions each disposed between the reactive region and a corresponding one of the pair of manifold regions, to diffuse a flow of the reactive gas, wherein a plurality of diffusion ribs is disposed in the diffusion region, to be spaced apart from one another, the plurality of diffusion ribs diffusing a flow of the reactive gas from the manifolds receiving the reactive gas to the reaction region, and wherein the plurality of diffusion ribs is disposed such that, at ends of the plurality of diffusion ribs adjacent to each of the pair of manifold regions, thicknesses of the plurality of diffusion ribs are different and gaps between adjacent ones of the plurality of diffusion ribs are different, and such that, at ends of the plurality of diffusion ribs adjacent to the reaction region, thicknesses of the plurality of diffusion ribs are equal and gaps between adjacent ones of the plurality of diffusion ribs are equal.

The pair of manifold regions may be divided into an inlet-side manifold region disposed at a reactive gas introduction side and an outlet-side manifold region disposed at a reactive gas discharge side. The plurality of manifolds may be disposed in the inlet-side manifold region and the outlet-side manifold region, to be spaced apart from one another in a direction from an upper side to a lower side with reference to a direction of gravity. The diffusion region may be divided into an inlet-side diffusion region disposed at the reactive gas introduction side and an outlet-side diffusion region disposed at the reactive gas discharge side. Diffusion ribs disposed in the inlet-side diffusion region of the plurality of diffusion ribs may be disposed to extend from an uppermost one of manifolds disposed in the inlet-side manifold region of the plurality of manifolds to the reaction region. Diffusion ribs disposed in the outlet-side diffusion region of the plurality of diffusion ribs may be disposed to extend from the reaction region to a lowermost one of manifolds disposed in the outlet-side manifold region of the plurality of manifolds.

Thicknesses of the diffusion ribs disposed in the inlet-side diffusion region and gaps of adjacent ones of the diffusion ribs disposed in the inlet-side diffusion region may be asymmetric with thicknesses of the diffusion ribs disposed in the outlet-side diffusion region and gaps of adjacent ones of the diffusion ribs disposed in the outlet-side diffusion region with reference to a center of the reaction region.

The reaction region may be divided into an upper reaction region, a middle reaction region, and a lower reaction region in a direction from an upper side to a lower side with reference to the direction of gravity. Each of the inlet-side diffusion region and the outlet-side diffusion region may be divided into a manifold region-side section adjacent to a corresponding one of the inlet-side manifold region and the outlet-side manifold region and a reaction region-side section adjacent to the reaction region. The diffusion ribs disposed in the inlet-side diffusion region may be divided into an inlet-side upper diffusion rib extending to the upper reaction region, an inlet-side middle diffusion rib extending to the middle reaction region, and an inlet-side lower diffusion rib extending to the lower reaction region. Thicknesses of diffusion ribs in the manifold region-side section of the inlet-side diffusion region of the plurality of diffusion ribs may be set such that thickness of the inlet-side upper diffusion rib is greater than a thickness of the inlet-side lower diffusion rib.

The thicknesses of the diffusion ribs in the manifold region-side section of the inlet-side diffusion region may be gradually decreased in a direction from the inlet-side upper diffusion rib to the inlet-side lower diffusion rib.

Gaps between adjacent ones of the diffusion ribs in the manifold region-side section of the inlet-side diffusion region may be set such that a gap of the inlet-side upper diffusion rib is smaller than a gap of the inlet-side lower diffusion rib.

The gaps between adjacent ones of the diffusion ribs in the manifold region-side section of the inlet-side diffusion region may be gradually increased in a direction from the inlet-side upper diffusion rib to the inlet-side lower diffusion rib.

Thicknesses of the diffusion ribs in the inlet-side diffusion region and gaps between adjacent ones of the diffusion ribs in the inlet-side diffusion region may be gradually varied in a direction from an end of the manifold region-side section to an end of the reaction region-side section.

The reaction region may be divided into an upper reaction region, a middle reaction region, and a lower reaction region in a direction from an upper side to a lower side with reference to the direction of gravity. Each of the inlet-side diffusion region and the outlet-side diffusion region may be divided into a manifold region-side section adjacent to a corresponding one of the inlet-side manifold region and the outlet-side manifold region and a reaction region-side section adjacent to the reaction region. The diffusion ribs disposed in the out-side diffusion region may be divided into an outlet-side upper diffusion rib extending from the upper reaction region, an outlet-side middle diffusion rib extending from the middle reaction region, and an outlet-side lower diffusion rib extending from the lower reaction region. Thicknesses of diffusion ribs in the manifold region-side section of the outlet-side diffusion region of the plurality of diffusion ribs may be set such that a thickness of the outlet-side upper diffusion rib is greater than a thickness of the outlet-side lower diffusion rib.

The thicknesses of the diffusion ribs in the manifold region-side section of the outlet-side diffusion region may be gradually decreased in a direction from the outlet-side upper diffusion rib to the outlet-side lower diffusion rib.

Gaps between adjacent ones of the diffusion ribs in the manifold region-side section of the outlet-side diffusion region may be set such that a gap of the outlet-side upper diffusion rib is smaller than a gap of the outlet-side lower diffusion rib.

The gaps between adjacent ones of the diffusion ribs in the manifold region-side section of the outlet-side diffusion region may be gradually increased in a direction from the outlet-side upper diffusion rib to the outlet-side lower diffusion rib.

Thicknesses of the diffusion ribs disposed in the outlet-side diffusion region and gaps of adjacent ones of the diffusion ribs disposed in the outlet-side diffusion region may be gradually varied in a direction from an end of the reaction region-side section to an end of the manifold region-side section.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
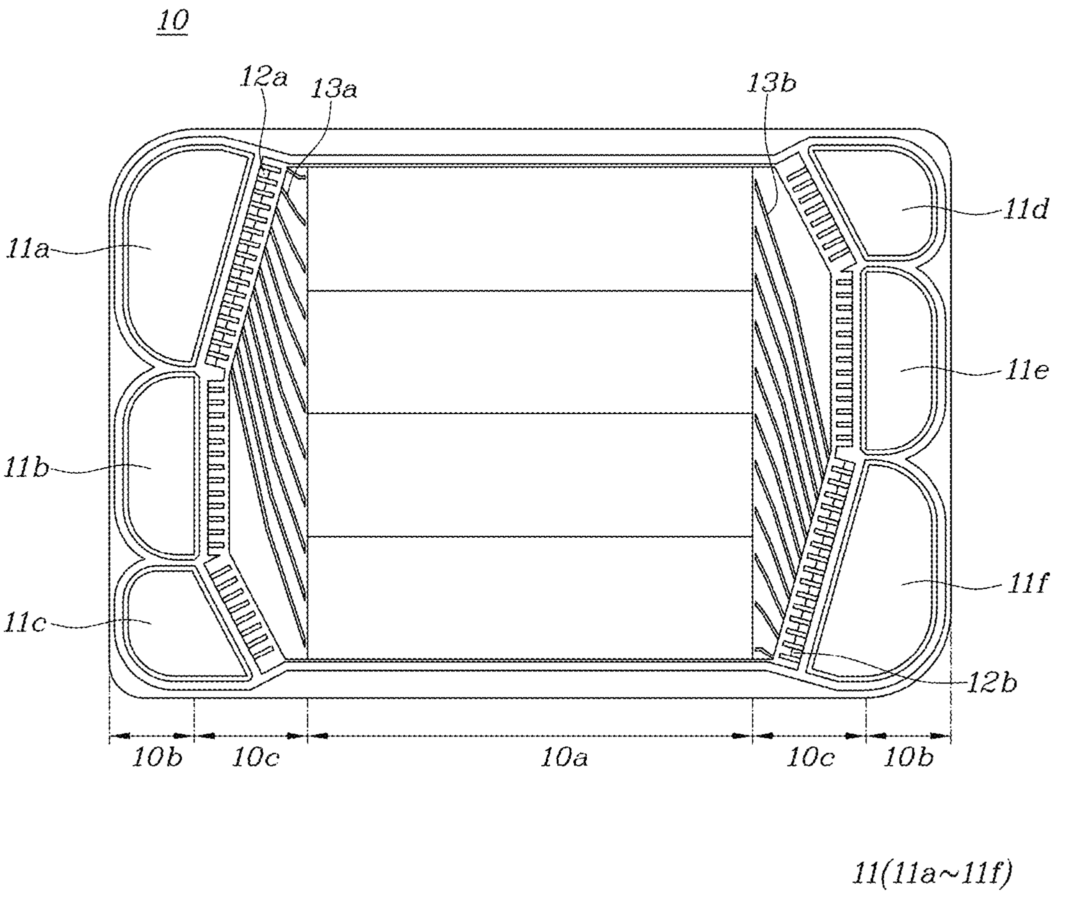
FIG. 1 is a view showing a general separator for a fuel cell having a conventional configuration.

Hereinafter, preferred embodiments of the present disclosure will be described in detail with reference to the accompanying drawings, and the same or similar elements are designated by the same reference numerals regardless of the numerals in the drawings and redundant description thereof will be omitted.

The suffixes "module" and "unit" of elements herein are used for convenience of description and thus can be used interchangeably and do not have any distinguishable meanings or functions.

In describing the present disclosure, moreover, the detailed description will be omitted when a specific description of publicly known technologies to which the disclosure pertains is judged to obscure the gist of the present disclosure. In addition, it should be noted that the accompanying drawings are merely illustrated to easily explain the spirit of the disclosure, and therefore, should not be construed as limiting the spirit of the disclosure to the accompanying drawings. On the contrary, the disclosure is to cover all modifications, equivalents, and alternatives falling within the spirit and scope of the disclosure as defined by the claims.

In the meantime, although terms including an ordinal number, such as first or second, may be used to describe a variety of constituent elements, the constituent elements are not limited to the terms, and the terms are used only for the purpose of discriminating one constituent element from other constituent elements.

It will be understood that, when one element is referred to as being "connected to" or "coupled to" another element, one element may be "connected to" or "coupled to" another element via a further element although one element may be directly connected to or directly coupled to another element. On the other hand, it will be understood that, when an element is referred to as being "directly connected to" or "directly coupled to" another element, there is no intervening element present.

As used in the description of the disclosure and the appended claims, the singular forms are intended to include the plural forms as well, unless context clearly indicates otherwise.

It will be further understood that the terms "comprises" and/or "comprising," or "includes" and/or "including" when used in this specification, specify the presence of stated features, regions, integers, steps, operations, elements, and/or combinations thereof, but do not preclude the presence or addition of one or more other features, regions, integers, steps, operations, elements, components, and/or combinations thereof.

Figure 2:
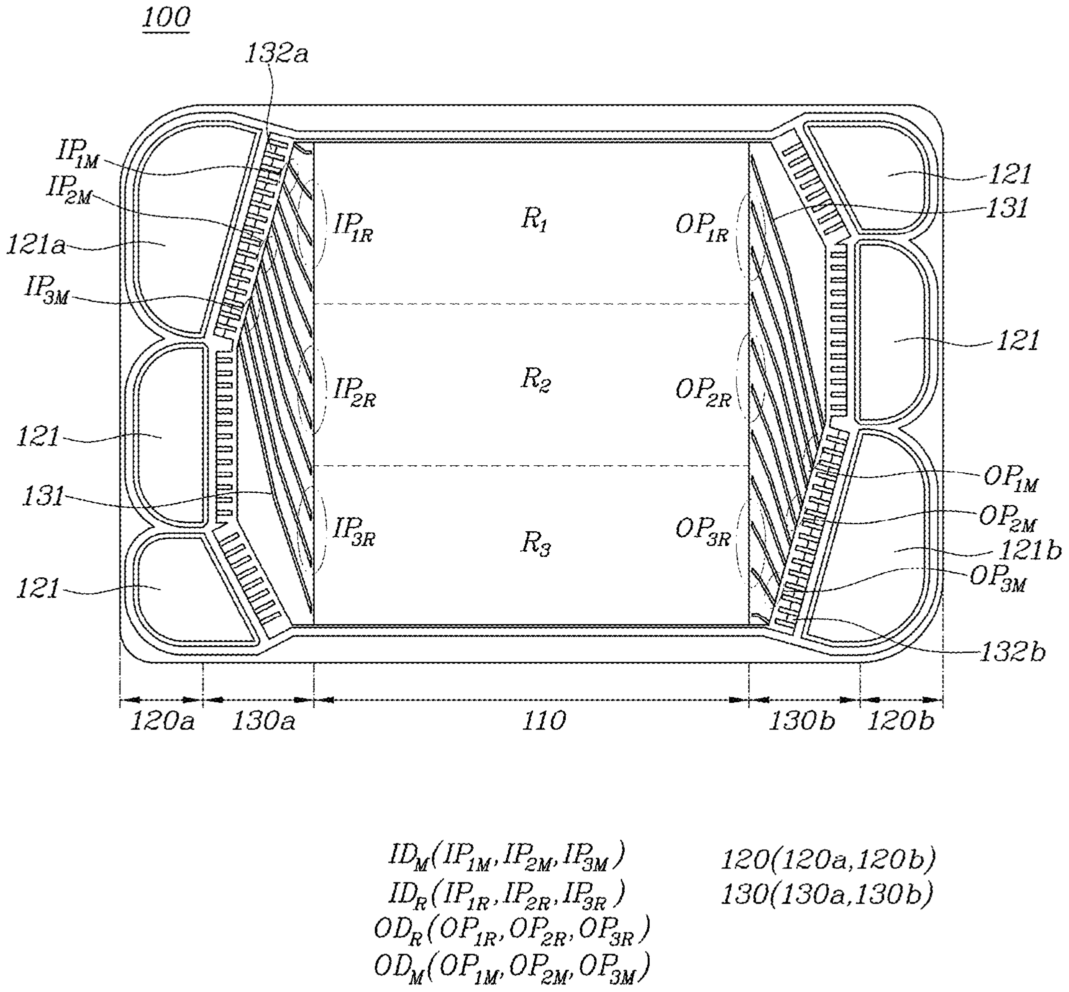
FIG. 2 is a view showing a separator for a fuel cell according to an exemplary embodiment of the present disclosure.

FIG. 2 is a view showing a separator for a fuel cell according to an exemplary embodiment of the present disclosure. FIGS. 3A to 6C are views showing thicknesses of diffusion ribs and gaps among the diffusion ribs in different regions of the separator according to the exemplary embodiment of the present disclosure.

Figure 3A:
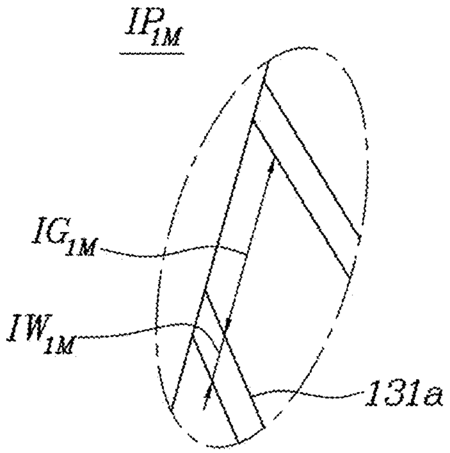
FIGS. 3A-3C, 4A-4C, 5A-5C and 6A-6C are views showing thicknesses of diffusion ribs and gaps among diffusion ribs in different regions of the separator according to the exemplary embodiment of the present disclosure.
Figure 3B:
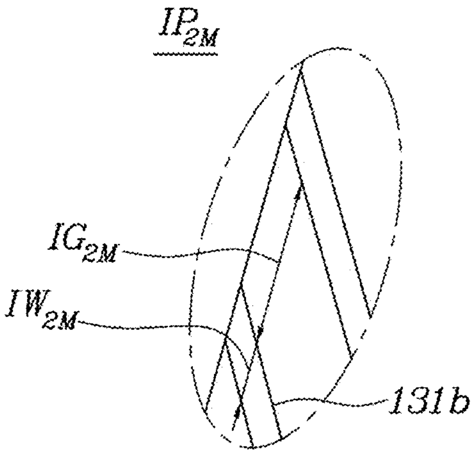
Figure 3C:
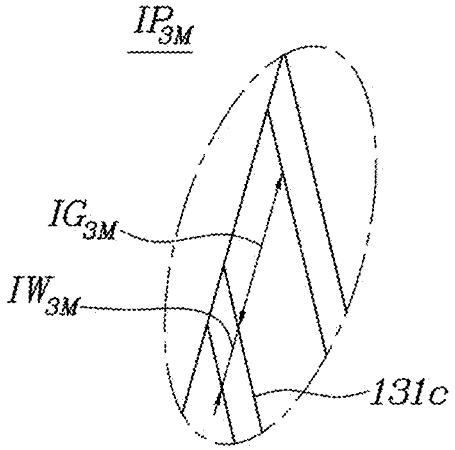
Figure 4A:
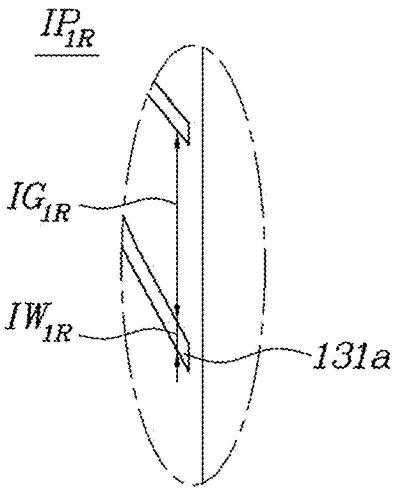
Figure 4B:
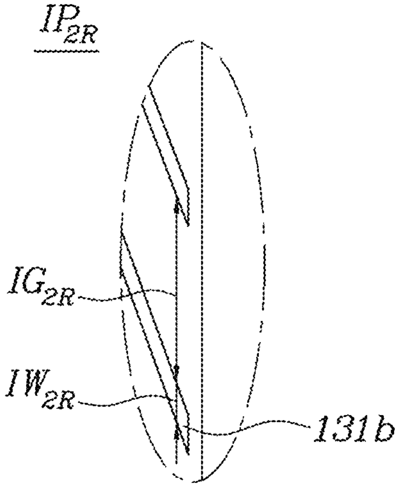
Figure 4C:
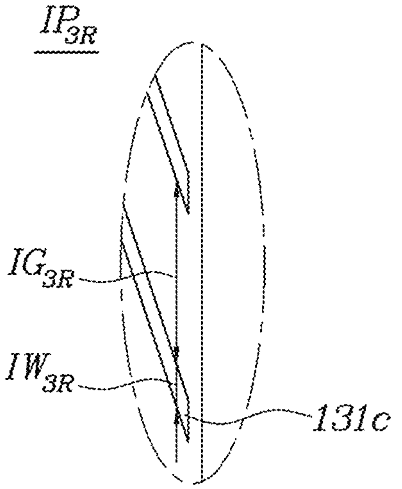
Figure 5A:
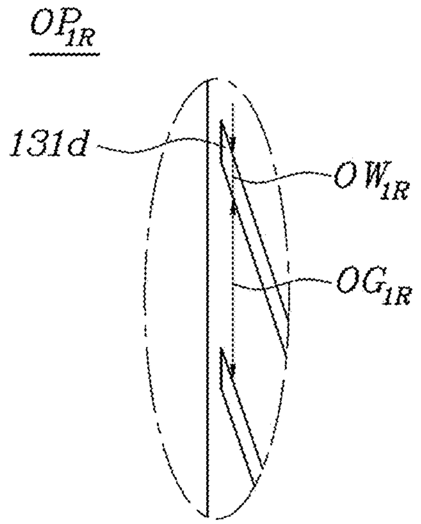
Figure 5B:
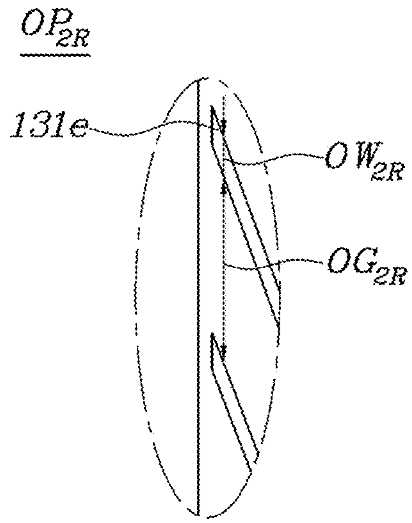
Figure 5C:
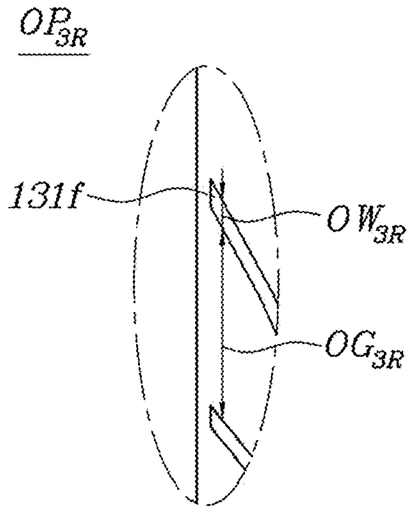
Figure 6A:
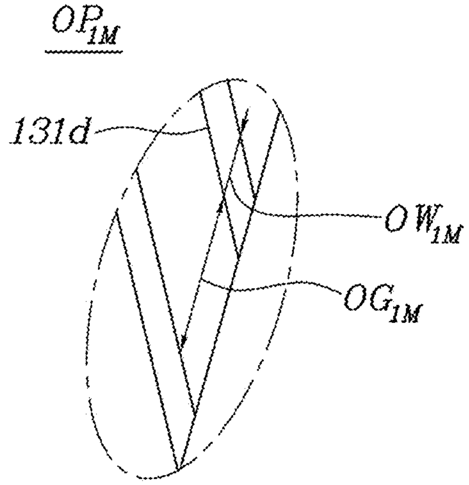
Figure 6B:
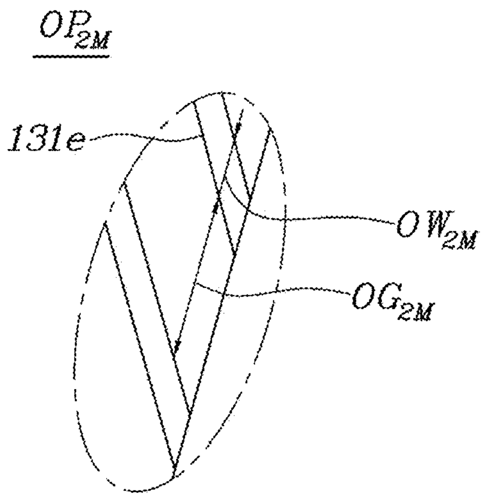
Figure 6C:
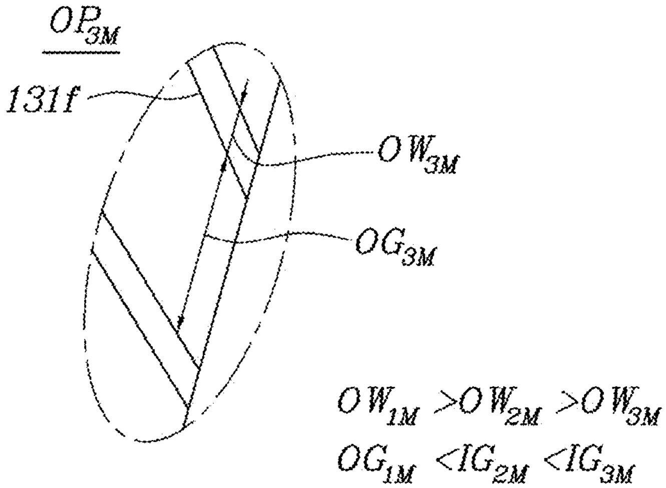

FIG. 3A to 3C are views showing sections of an inlet-side diffusion region at the side of a manifold region. FIG. 4A to 4C are views showing sections of the inlet-side diffusion region at the side of a reaction region. FIG. 5A to 5C are views showing sections of an outlet-side diffusion region at the side of the reaction region. FIG. 6A to 6C are views showing sections of the outlet-side diffusion region at the side of the manifold region.

As shown in FIG. 2, the separator according to the exemplary embodiment of the present disclosure, which is designated by reference numeral "100", has a configuration similar to the conventional configuration of the general separator 10 for a fuel cell. That is, the separator 100 according to the exemplary embodiment of the present disclosure is disposed, at a central portion thereof, with a reaction region 110 where reactive gases, that is, hydrogen and air (oxygen), react with each other, through lamination of a membrane electrode assembly and a gas diffusion layer. The separator 100 is also disposed, at opposite sides of the reaction region 110, with a pair of manifold regions 120 through which a plurality of manifolds 121 extend, respectively. The reactive gases or a coolant is introduced into or discharged out of the manifolds 121. A pair of diffusion regions 130 is disposed between the pair of manifold regions 120 and the reaction region 110, respectively, to diffuse a flow of the reactive gases or the coolant.

In this case, the plurality of manifolds 121 disposed in the manifold regions 120 includes a manifold 121, through which a reactive gas, that is, hydrogen, is introduced or discharged, a manifold 121, through which a reactive gas, that is, air, is introduced or discharged, and a manifold 121, through which the coolant is introduced or discharged.

In addition, a plurality of diffusion ribs 131 is disposed in the pair of diffusion regions 130. The plurality of diffusion ribs 131 diffuses the reactive gases and the coolant received from inlet-side ones of the manifolds 121, and guides the diffused reactive gases and coolant to flow to the reaction region 110. The plurality of diffusion ribs 131 also collects the reactive gases and the coolant discharged from the reaction region 110, and guides the collected reactive gases and coolant to flow to outlet-side ones of the manifolds 121.

For example, when the separator is a cathode separator, a reactive gas inlet 132*a*, through which air is introduced, is disposed near the inlet-side manifold 121 associated with air, and a reactive gas outlet 132*b*, through which air is discharged, is disposed near the outlet-side manifold 121 associated with air.

In this case, the plurality of diffusion ribs 131 is disposed to be spaced apart from one another, in order to diffuse flow of a reactive gas from the manifold 121, into which the reactive gas is introduced, to the reaction region 110.

In accordance with the exemplary embodiment of the present disclosure, thicknesses of the diffusion ribs 131 disposed in the diffusion regions 130 are set to be different and gaps between adjacent ones of the diffusion ribs 131 are set to be different. In order to give a clear description, the separator 100 is divided into different regions.

For example, the pair of manifold regions 120 is divided into an inlet-side manifold region 120*a* disposed at a reactive gas introduction side and an outlet-side manifold region 120*b* disposed at a reactive gas discharge side.

In addition, the pair of diffusion regions 130 is divided into an inlet-side diffusion region 130*a* disposed at the reactive gas introduction side and an outlet-side diffusion region 130*b* disposed at the reactive gas discharge side.

In addition, the reaction region 110 is divided into an upper reaction region R1, a middle reaction region R2, and a lower reaction region R3 in a direction from an upper side to a lower side with reference to the direction of gravity.

In addition, the inlet-side diffusion region 130*a* is also divided into a manifold region-side section $ID_M$ adjacent to the inlet-side manifold region 120*a* and a reaction region-side section $ID_R$ adjacent to the reaction region 110, and the outlet-side diffusion region 130*b* is also divided into a reaction region-side section $OD_R$ adjacent to the reaction region 110 and a manifold region-side section $OD_M$ adjacent to the outlet-side manifold region 120*b*.

The diffusion ribs 131 disposed in the inlet-side diffusion region 130*a* are divided into an inlet-side upper diffusion rib 131*a* extending to the upper reaction region R1, an outlet-side middle diffusion rib 131*b* extending to the middle reaction region R2, and an outlet-side lower diffusion rib 131*c* extending to the lower reaction region R3.

In addition, the diffusion ribs 131 disposed in the outlet-side diffusion region 130*b* are divided into an outlet-side upper diffusion rib 131*d* extending from the upper reaction region R1, an outlet-side middle diffusion rib 131*e* extending from the middle reaction region R2, and an outlet-side lower diffusion rib 131*f* extending from the lower reaction region R3.

Meanwhile, a plurality of manifolds 121 is disposed in each of the inlet-side manifold region 120*a* and the outlet-side manifold region 120*b* to be spaced apart from one another in a direction from an upper side to a lower side with reference to the direction of gravity. In this embodiment, hydrogen and air (oxygen) as reactive gases are introduced and discharged, and a coolant is introduced and discharged, and, as such, three manifolds 121 are disposed in each of the inlet-side manifold region 120*a* and the outlet-side manifold region 120*b* in a direction an upper side to a lower side with reference to the direction of gravity.

For example, when the separator 100 according to this embodiment is applied to a cathode separator, air is introduced through an uppermost one of the manifolds 121 disposed in the inlet-side manifold region 120*a*, that is, a manifold 121*a*. The introduced air flows while being diffused in the inlet-side diffusion region 130*a*, and is then supplied to the reaction region 110. The air passing through the reaction region 110 is collected in the outlet-side diffusion region 130*b*, and is then discharged through a lowermost one of the manifolds 121 disposed in the outlet-side manifold region 120*b*, that is, a manifold 121*b*.

For such a configuration, the diffusion ribs 131 disposed in the inlet-side diffusion region 130*a* are disposed to extend from the uppermost one of the manifolds 121 disposed in the inlet-side manifold region 120*a*, that is, the manifold 121*a*, to the reaction region 110.

In addition, the diffusion ribs 131 disposed in the outlet-side diffusion region 130*b* are disposed to extend from the reaction region 110 to the lowermost one of the manifolds 121 disposed in the outlet-side manifold region 120*b*, that is, the manifold 121*b*.

In this case, each of the inlet-side upper diffusion rib 131*a*, the inlet-side middle diffusion rib 131*b*, and the inlet-side lower diffusion rib 131*c* disposed in the inlet-side diffusion region 130*a* is provided in plural such that the plurality of diffusion ribs is disposed to be spaced apart from one another by a predetermined gap.

Similarly, each of the outlet-side upper diffusion rib 131*d*, the outlet-side middle diffusion rib 131*e*, and the outlet-side lower diffusion rib 131*f* disposed in the outlet-side diffusion region 130*b* is provided in plural such that the plurality of diffusion ribs is disposed to be spaced apart from one another by a predetermined gap.

Meanwhile, as described above, in accordance with the exemplary embodiment of the present disclosure, thicknesses of the diffusion ribs 131 disposed in the diffusion regions 130 and gaps between adjacent ones of the diffusion ribs 131 are adjusted in accordance with different regions and different sections in order to uniformly distribute a flow amount of each reactive gas throughout the entirety of the diffusion region 130.

For such purposes, the plurality of diffusion ribs 131 is disposed such that, at ends of the diffusion ribs 131 adjacent to the manifold region 120, thicknesses of the diffusion ribs 131 are different and gaps between adjacent ones of the diffusion ribs 131 are different, and such that, at ends of the diffusion ribs 131 adjacent to the reaction region 110, thicknesses of the diffusion ribs 131 are equal and gaps between adjacent ones of the diffusion ribs 131 are equal.

First, the inlet-side diffusion region 130*a* will be described. As shown in FIGS. 3A to 3C and 4A to 4C, thicknesses of the diffusion ribs 131 in the manifold region-side section $ID_M$ of the inlet-side diffusion region 130*a* are set such that a thickness $IW_{1M}$ of the inlet-side upper diffusion rib 131*a* is greater than a thickness $IW_{3M}$ of an inlet-side lower diffusion rib 131*c* ($IW_{1M}>IW_{3M}$).

In this case, it is preferred that the thicknesses of the diffusion ribs 131 in the manifold region-side section $ID_M$ of the inlet-side diffusion region 130*a* be gradually decreased in a direction from the inlet-side upper diffusion rib 131*a* to the inlet-side lower diffusion rib 131*c*. Accordingly, it is preferred that the thicknesses of the diffusion ribs 131 be gradually decreased in an order of the thickness $IW_{1M}$ of the inlet-side upper diffusion rib 131*a*, a thickness $IW_{2M}$ of the inlet-side middle diffusion rib 131*b*, and the thickness $IW_{3M}$ of the inlet-side lower diffusion rib 131*c* ($IW_{1M}>IW_{2M}>IW_{3M}$).

In particular, it is preferred that the plurality of inlet-side upper diffusion ribs 131*a* be disposed to have thicknesses gradually decreased in a direction from an uppermost one thereof to a lowermost one thereof, respectively.

Similarly, it is preferred that the plurality of inlet-side middle diffusion ribs 131*b* be disposed to have thicknesses gradually decreased in a direction from an uppermost one thereof to a lowermost one thereof, respectively, and the plurality of inlet-side lower diffusion ribs 131*c* be disposed to have thicknesses gradually decreased in a direction from an uppermost one thereof to a lowermost one thereof, respectively.

Thus, it is preferred that the diffusion ribs 131 disposed in the inlet-side diffusion region 130*a* have thicknesses gradually decreased in a direction from an upper side to a lower side, respectively.

On the other hand, it is preferred that the thicknesses of the diffusion ribs 131 in the reaction region side section $ID_R$ of the inlet-side diffusion region 130*a* be set such that a thickness $IW_{1R}$ of the inlet-side upper diffusion rib 131*a*, a thickness $IW_{2R}$ of the inlet-side middle diffusion rib 131*b*, and the thickness $IW_{3R}$ of the inlet-side lower diffusion rib 131*c* are equal ($IW_{1R}=IW_{2R}=IW_{3R}$).

Meanwhile, gaps between adjacent ones of the diffusion ribs 131 in the manifold region-side section $ID_M$ of the inlet-side diffusion region 130*a* are set such that a gap $IG_{1M}$ of the inlet-side upper diffusion rib 131*a* is smaller than a gap $IG_{3M}$ of the inlet-side lower diffusion rib 131*c* ($IG_{1M}<IG_{3M}$).

In this case, it is preferred that the gaps between adjacent ones of the diffusion ribs 131 in the manifold region-side section $ID_M$ of the inlet-side diffusion region 130*a* be gradually increased in a direction from the inlet-side upper diffusion rib 131*a* to the inlet-side lower diffusion rib 131*c*. Accordingly, it is preferred that the gaps between adjacent ones of the diffusion ribs 131 in the manifold region-side section $ID_M$ of the inlet-side diffusion region 130*a* be gradually increased in an order of the gap $IG_{1M}$ of the inlet-side upper diffusion rib 131*a*, a gap $IG_{2M}$ of the inlet-side middle diffusion rib 131*b*, and the gap $IG_{3M}$ of the inlet-side lower diffusion rib 131*c* ($IG_{1M}<IG_{2M}<IG_{3M}$).

In particular, it is preferred that the plurality of inlet-side upper diffusion ribs 131*a* be disposed to have gaps gradually increased in a direction from an uppermost one thereof to a lowermost one thereof, respectively.

Similarly, it is preferred that the plurality of inlet-side middle diffusion ribs 131*b* be disposed to have gaps gradually increased in a direction from an uppermost one thereof to a lowermost one thereof, respectively, and the plurality of inlet-side lower diffusion ribs 131*c* be disposed to have gaps gradually increased in a direction from an uppermost one thereof to a lowermost one thereof, respectively.

Thus, it is preferred that the diffusion ribs 131 disposed in the inlet-side diffusion region 130*a* have gaps gradually increased in a direction from an upper side to a lower side, respectively.

On the other hand, it is preferred that the gaps between adjacent ones of the diffusion ribs 131 in the reaction region-side section $ID_R$ of the inlet-side diffusion region 130*a* be set such that a gap $IG_{1R}$ of the inlet-side upper diffusion rib 131*a*, a gap $IG_{2R}$ of the inlet-side middle diffusion rib 131*b*, and a gap $IG_{3R}$ of the inlet-side lower diffusion rib 131*c* are equal ($IG_{1R}=IG_{2R}=IG_{3R}$).

Meanwhile, since the inlet-side upper diffusion rib 131*a*, the inlet-side middle diffusion rib 131*b*, and the inlet-side lower diffusion rib 131*c* disposed in the inlet-side diffusion region 130*a* have different thicknesses and different gaps in the manifold region-side section $ID_M$ while having the same thickness and the same gap in the reaction region-side section $ID_R$, it is preferred that the thicknesses and the gaps of the inlet-side upper diffusion rib 131*a*, the inlet-side middle diffusion rib 131*b*, and the inlet-side lower diffusion rib 131*c* be set to be gradually varied from an end of the manifold region-side section $ID_M$ to an end of the reaction region-side section $ID_R$ in the inlet-side diffusion region 130*a*.

Next, the outlet-side diffusion region 130*b* will be described. As shown in FIGS. 5A to 5C and 6A to 6C, thicknesses of the diffusion ribs 131 in the manifold region-side section $OD_M$ of the outlet-side diffusion region 130*b* are set such that a thickness $OW_{1M}$ of the outlet-side upper diffusion rib 131*d* is greater than a thickness $OW_{3M}$ of an outlet-side lower diffusion rib 131*f* ($OW_{1M}>OW_{3M}$).

In this case, it is preferred that the thicknesses of the diffusion ribs 131 in the manifold region-side section $OD_M$ of the outlet-side diffusion region 130*b* be gradually decreased in a direction from the outlet-side upper diffusion rib 131*d* to the outlet-side lower diffusion rib 131*f*. Accordingly, it is preferred that the thicknesses of the diffusion ribs 131 be gradually decreased in an order of the thickness $OW_{1M}$ of the outlet-side upper diffusion rib 131*d*, a thickness $OW_{2M}$ of the outlet-side middle diffusion rib 131*e*, and the thickness $OW_{3M}$ of the outlet-side lower diffusion rib 131*f* ($OW_{1M}>OW_{2M}>OW_{3M}$).

In particular, it is preferred that the plurality of outlet-side upper diffusion ribs 131*d* be disposed to have thicknesses gradually decreased in a direction from an uppermost one thereof to a lowermost one thereof, respectively.

Similarly, it is preferred that the plurality of outlet-side middle diffusion ribs 131*e* be disposed to have thicknesses gradually decreased in a direction from an uppermost one thereof to a lowermost one thereof, respectively, and the plurality of outlet-side lower diffusion ribs 131*f* be disposed to have thicknesses gradually decreased in a direction from an uppermost one thereof to a lowermost one thereof, respectively.

Thus, it is preferred that the diffusion ribs 131 disposed in the outlet-side diffusion region 130*b* have thicknesses gradually decreased in a direction from an upper side to a lower side, respectively.

On the other hand, it is preferred that the thicknesses of the diffusion ribs 131 in the reaction region side section $OD_R$ of the outlet-side diffusion region 130*b* be set such that a thickness $OW_{1R}$ of the outlet-side upper diffusion rib 131*d*, a thickness $OW_{2R}$ of the outlet-side middle diffusion rib 131*e*, and the thickness $OW_{3R}$ of the outlet-side lower diffusion rib 131*f* are equal ($OW_{1R}=OW_{2R}=OW_{3R}$).

Meanwhile, gaps between adjacent ones of the diffusion ribs 131 in the manifold region-side section $OD_R$ of the outlet-side diffusion region 130*b* are set such that a gap $OG_{1M}$ of the outlet-side upper diffusion rib 131*d* is smaller than a gap $OG_{3M}$ of the outlet-side lower diffusion rib 131*f* ($OG_{1M}<OG_{3M}$).

In this case, it is preferred that the gaps between adjacent ones of the diffusion ribs 131 in the manifold region-side section $OD_R$ of the outlet-side diffusion region 130*b* be gradually increased in a direction from the outlet-side upper diffusion rib 131*d* to the outlet-side lower diffusion rib 131*f*. Accordingly, it is preferred that the gaps between adjacent ones of the diffusion ribs 131 in the manifold region-side section $OD_R$ of the outlet-side diffusion region 130*b* be gradually increased in an order of the gap $OG_{1M}$ of the outlet-side upper diffusion rib 131*d*, a gap $OG_{2M}$ of the outlet-side middle diffusion rib 131*e*, and the gap $OG_{3M}$ of the outlet-side lower diffusion rib 131*f* ($OG_{1M}<OG_{2M}<OG_{3M}$).

In particular, it is preferred that the plurality of outlet-side upper diffusion ribs 131*d* be disposed to have gaps gradually increased in a direction from an uppermost one thereof to a lowermost one thereof, respectively.

Similarly, it is preferred that the plurality of outlet-side middle diffusion ribs 131*e* be disposed to have gaps gradually increased in a direction from an uppermost one thereof to a lowermost one thereof, respectively, and the plurality of outlet-side lower diffusion ribs 131*f* be disposed to have gaps gradually increased in a direction from an uppermost one thereof to a lowermost one thereof, respectively.

Thus, it is preferred that the diffusion ribs 131 disposed in the outlet-side diffusion region 130*b* have gaps gradually increased in a direction from an upper side to a lower side, respectively.

On the other hand, it is preferred that the gaps between adjacent ones of the diffusion ribs 131 in the reaction region side section $OD_R$ of the outlet-side diffusion region 130*b* be set such that a gap $OG_{1R}$ of the outlet-side upper diffusion rib 131*d*, a gap $OG_{2R}$ of the outlet-side middle diffusion rib 131*e*, and a gap $OG_{3R}$ of the outlet-side lower diffusion rib 131*f* are equal ($OG_{1R}=OG_{2R}=OG_{3R}$).

Meanwhile, since the outlet-side upper diffusion rib 131*d*, the outlet-side middle diffusion rib 131*e*, and the outlet-side lower diffusion rib 131*f* disposed in the outlet-side diffusion region 130*b* have the same thickness and the same gap in the reaction region-side section $OD_R$ while having different thicknesses and different gaps in the manifold region-side section $OD_M$, it is preferred that the thicknesses and the gaps of the outlet-side upper diffusion rib 131*d*, the outlet-side middle diffusion rib 131*e*, and the outlet-side lower diffusion rib 131*f* be set to be gradually varied from an end of the reaction region-side section $OD_R$ to an end of the manifold region-side section $OD_M$ in the outlet-side diffusion region 130*b*.

In order to implement a structure in which the diffusion ribs 131 in the inlet-side diffusion region 130*a* extend to be diverged toward the entirety of the reaction region 110 at one side of the reaction region 110, starting from the uppermost one of the manifolds disposed in the inlet-side manifold region 120*a*, that is, the manifold 121*a*, as described above, lengths of the inlet-side upper diffusion ribs 131*a*, the inlet-side middle diffusion ribs 131*b*, and the inlet-side lower diffusion ribs 131*c* in the inlet-side diffusion region 130*a* are gradually increased in a direction from an upper side to a lower side.

Conversely, in order to implement a structure in which the diffusion ribs 131 in the outlet-side diffusion region 130*b* extend to be converged toward the lowermost one of the manifolds disposed in the outlet-side manifold region 120*b*, that is, the manifold 121*b*, starting from the entirety of the reaction region 110 at the other side of the reaction region 110, lengths of the outlet-side upper diffusion ribs 131*d*, the outlet-side middle diffusion ribs 131*e*, and the outlet-side lower diffusion ribs 131*f* in the outlet-side diffusion region 130*b* are gradually decreased in a direction from an upper side to a lower side.

Accordingly, thicknesses and gaps of the diffusion ribs 131 disposed in the inlet-side diffusion region 130*a* are asymmetric with those of the diffusion ribs 131 disposed in the outlet-side diffusion region 130*b* without being point symmetric therewith with reference to a center of the reaction region 110.

Meanwhile, the separator according to the exemplary embodiment of the present disclosure was compared with a general separator in terms of distribution of water produced during operation of a stack, in order to check distribution of a flow amount of fluid in each of the separators.

As apparent from the above description, in accordance with the exemplary embodiment of the present disclosure, it may be possible to achieve an effect of uniformly distributing a flow amount of reactive gas throughout the entirety of a diffusion region by adjusting thicknesses of diffusion ribs and gaps between adjacent ones of the diffusion ribs on a region basis.

In addition, in accordance with the exemplary embodiment of the present disclosure, thicknesses and gaps of diffusion ribs disposed in an inlet-side diffusion region are asymmetric with those of diffusion ribs disposed in an outlet-side diffusion region with reference to a center of a reaction region. Accordingly, it may be possible to achieve an effect of uniformly distributing a flow amount of reactive gas throughout the entirety of a diffusion region, taking into consideration a length of a flow path of the reactive gas structurally disposed in accordance with a position of a manifold.

Accordingly, it may also be possible to achieve uniform flow of the reactive gas and uniform discharge of produced water and, as such, durability of the resultant stack may be enhanced, and non-uniform electrochemical reaction at upper and lower ends of the stack may be prevented.

In addition, through the above-described effects, it may be possible to enhance performance of the stack, to suppress generation of a deviation in voltage during operation of the stack, and to reduce vibration of a cell.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A separator for a fuel cell comprising:

a reaction region disposed at a central portion of the separator;

a pair of manifold regions disposed in a vicinity of the reaction region, each of the pair of manifold regions comprising a plurality of manifolds configured to allow a reactive gas to be introduced or discharged therethrough; and a diffusion region disposed between the reactive region and each of the pair of manifold regions, to diffuse a flow of the reactive gas, wherein a plurality of diffusion ribs is disposed in the diffusion region, to be spaced apart from one another, the plurality of diffusion ribs diffusing a flow of the reactive gas from the plurality of manifolds receiving the reactive gas to the reaction region, and wherein the plurality of diffusion ribs is disposed such that, at ends of the plurality of diffusion ribs adjacent to each of the pair of manifold regions, thicknesses of the plurality of diffusion ribs are different and gaps between adjacent ones of the plurality of diffusion ribs are different, and such that, at ends of the plurality of diffusion ribs adjacent to the reaction region, thicknesses of the plurality of diffusion ribs are equal and gaps between adjacent ones of the plurality of diffusion ribs are equal.

2. The separator according to claim 1, wherein:

the pair of manifold regions is divided into an inlet-side manifold region disposed at a reactive gas introduction side and an outlet-side manifold region disposed at a reactive gas discharge side;

the plurality of manifolds is disposed in the inlet-side manifold region and the outlet-side manifold region, to be spaced apart from one another in a direction from an upper side to a lower side with reference to a direction of gravity;

the diffusion region is divided into an inlet-side diffusion region disposed at the reactive gas introduction side and an outlet-side diffusion region disposed at the reactive gas discharge side;

diffusion ribs disposed in the inlet-side diffusion region of the plurality of diffusion ribs are disposed to extend from an uppermost one of manifolds disposed in the inlet-side manifold region of the plurality of manifolds to the reaction region; and diffusion ribs disposed in the outlet-side diffusion region of the plurality of diffusion ribs are disposed to extend from the reaction region to a lowermost one of manifolds disposed in the outlet-side manifold region of the plurality of manifolds.

3. The separator according to claim 2, wherein thicknesses of the diffusion ribs disposed in the inlet-side diffusion region and gaps of adjacent ones of the diffusion ribs disposed in the inlet-side diffusion region are asymmetric with thicknesses of the diffusion ribs disposed in the outlet-side diffusion region and gaps of adjacent ones of the diffusion ribs disposed in the outlet-side diffusion region with reference to a center of the reaction region.

4. The separator according to claim 2, wherein:

the reaction region is divided into an upper reaction region, a middle reaction region, and a lower reaction region in a direction from an upper side to a lower side with reference to the direction of gravity;

each of the inlet-side diffusion region and the outlet-side diffusion region is divided into a manifold region-side section adjacent to a corresponding one of the inlet-side manifold region and the outlet-side manifold region and a reaction region-side section adjacent to the reaction region;

the diffusion ribs disposed in the inlet-side diffusion region are divided into an inlet-side upper diffusion rib extending to the upper reaction region, an inlet-side middle diffusion rib extending to the middle reaction region, and an inlet-side lower diffusion rib extending to the lower reaction region; and thicknesses of diffusion ribs in the manifold region-side section of the inlet-side diffusion region of the plurality of diffusion ribs are set such that thickness of the inlet-side upper diffusion rib is greater than a thickness of the inlet-side lower diffusion rib.

5. The separator according to claim 4, wherein the thicknesses of the diffusion ribs in the manifold region-side section of the inlet-side diffusion region are gradually decreased in a direction from the inlet-side upper diffusion rib to the inlet-side lower diffusion rib.

6. The separator according to claim 4, wherein gaps between adjacent ones of the diffusion ribs in the manifold region-side section of the inlet-side diffusion region are set such that a gap of the inlet-side upper diffusion rib is smaller than a gap of the inlet-side lower diffusion rib.

7. The separator according to claim 6, wherein the gaps between adjacent ones of the diffusion ribs in the manifold region-side section of the inlet-side diffusion region are gradually increased in a direction from the inlet-side upper diffusion rib to the inlet-side lower diffusion rib.

8. The separator according to claim 4, wherein thicknesses of the diffusion ribs in the inlet-side diffusion region and gaps between adjacent ones of the diffusion ribs in the inlet-side diffusion region are gradually varied in a direction from an end of the manifold region-side section to an end of the reaction region-side section.

9. The separator according to claim 2, wherein:

the reaction region is divided into an upper reaction region, a middle reaction region, and a lower reaction region in a direction from an upper side to a lower side with reference to the direction of gravity;

each of the inlet-side diffusion region and the outlet-side diffusion region is divided into a manifold region-side section adjacent to a corresponding one of the inlet-side manifold region and the outlet-side manifold region and a reaction region-side section adjacent to the reaction region;

the diffusion ribs disposed in the out-side diffusion region are divided into an outlet-side upper diffusion rib extending from the upper reaction region, an outlet-side middle diffusion rib extending from the middle reaction region, and an outlet-side lower diffusion rib extending from the lower reaction region; and thicknesses of diffusion ribs in the manifold region-side section of the outlet-side diffusion region of the plurality of diffusion ribs are set such that a thickness of the outlet-side upper diffusion rib is greater than a thickness of the outlet-side lower diffusion rib.

10. The separator according to claim 9, wherein the thicknesses of the diffusion ribs in the manifold region-side section of the outlet-side diffusion region are gradually decreased in a direction from the outlet-side upper diffusion rib to the outlet-side lower diffusion rib.

11. The separator according to claim 9, wherein gaps between adjacent ones of the diffusion ribs in the manifold region-side section of the outlet-side diffusion region are set such that a gap of the outlet-side upper diffusion rib is smaller than a gap of the outlet-side lower diffusion rib.

12. The separator according to claim 11, wherein the gaps between adjacent ones of the diffusion ribs in the manifold region-side section of the outlet-side diffusion region are gradually increased in a direction from the outlet-side upper diffusion rib to the outlet-side lower diffusion rib.

13. The separator according to claim 9, wherein thicknesses of the diffusion ribs disposed in the outlet-side diffusion region and gaps of adjacent ones of the diffusion ribs disposed in the outlet-side diffusion region are gradually varied in a direction from an end of the reaction region-side section to an end of the manifold region-side section.

* * * * *